(12) United States Patent
Adrangi et al.

(10) Patent No.: US 7,292,558 B2
(45) Date of Patent: Nov. 6, 2007

(54) METHOD AND APPARATUS FOR A CENTRALIZED HOME AGENT FUNCTION

(75) Inventors: Farid Adrangi, Lake Oswego, OR (US); Ramesh Illikkal, Portland, OR (US)

(73) Assignee: Intel Corporation, Sant Clara, CA (US)

( * ) Notice: Subject to any disclaimer, the term of this patent is extended or adjusted under 35 U.S.C. 154(b) by 1103 days.

(21) Appl. No.: 10/229,590

(22) Filed: Aug. 27, 2002

(65) Prior Publication Data

US 2004/0042441 A1    Mar. 4, 2004

(51) Int. Cl.
*H04Q 7/20* (2006.01)
*H04J 3/24* (2006.01)
*H04L 12/28* (2006.01)
*H04L 12/66* (2006.01)
*G06F 15/16* (2006.01)

(52) U.S. Cl. ............... 370/338; 370/349; 370/352; 370/401; 370/410; 455/433; 455/435.1; 709/203; 709/249

(58) Field of Classification Search ........... 370/338, 370/349, 352, 401, 410; 455/433, 435.1; 709/203, 249
See application file for complete search history.

(56) References Cited

U.S. PATENT DOCUMENTS

| | | | |
|---|---|---|---|
| 6,622,016 B1* | 9/2003 | Sladek et al. | 455/414.1 |
| 6,760,444 B1* | 7/2004 | Leung | 380/270 |
| 6,775,253 B1* | 8/2004 | Agrawal et al. | 370/329 |
| 7,080,151 B1* | 7/2006 | Borella et al. | 709/230 |
| 7,149,229 B1* | 12/2006 | Leung | 370/466 |
| 2003/0104814 A1* | 6/2003 | Gwon et al. | 455/436 |

OTHER PUBLICATIONS

"Intorduction to Mobile IP", CISCO, Oct. 8, 2001, Version 1, retrieved from web site "http://www.cisco.com/en/US/tech/tk369/technologies_white_paper09186a00800c9906.shtml".*

* cited by examiner

*Primary Examiner*—Alpus H. Hsu
(74) *Attorney, Agent, or Firm*—Blakely, Sokoloff, Taylor & Zafman LLP

(57) ABSTRACT

A method is described that includes intercepting a packet destined for a mobile VoIP device where the mobile VoIP device has roamed into a foreign subnet. The method also includes sending the packet to the foreign subnet without sending the packet to the mobile VoIP device's home subnet beforehand.

20 Claims, 7 Drawing Sheets

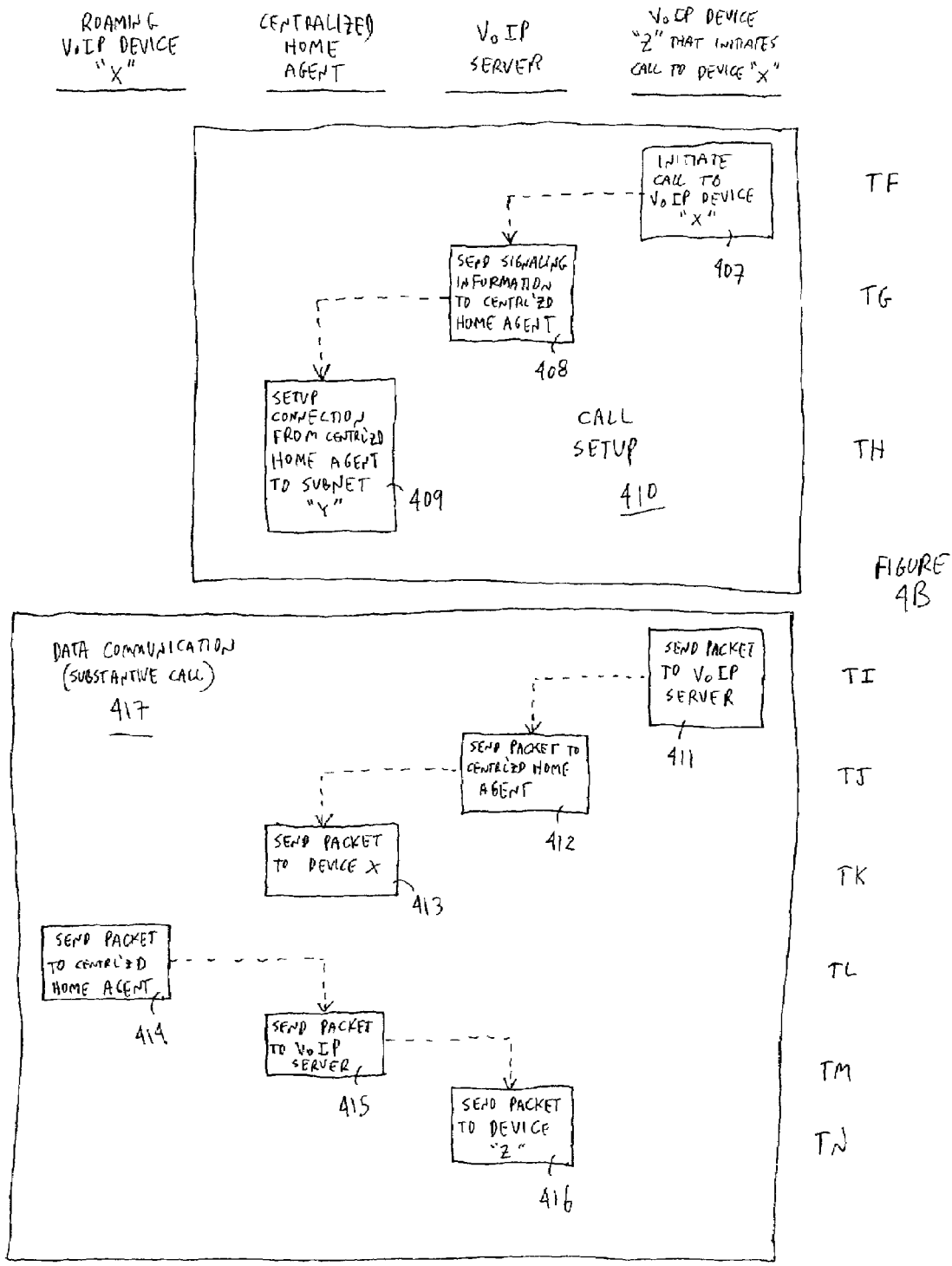

METHOD AND APPARATUS FOR A CENTRALIZED HOME AGENT FUNCTION

FIELD OF INVENTION

The field of invention relates generally to networking; and, more specifically, to a method and apparatus for a centralized home agent function.

BACKGROUND

FIG. 1 relates to the present manner in which Voice Over IP (VoIP) communications are supported. VoIP, as is understood by those of ordinary skill, is a term of art that relates to the ability of an IP based packet network to support "real time" communications such as telephone conversations, video-conferences, etc. IP is an acronym for the Internet Protocol (IP). The IP protocol (of which various downward compatible versions currently exist and may be developed in the future) is a networking protocol that is used, in a sense, as a cohesive "glue" that communicatively couples smaller networks (which are often referred to as "subnets") to one another. An IP subnet refers to a segment of an IP network. IP-based devices associated with the same subnet have the same network prefix; but are distinguished from one another with a different host ID within their respective IP addresses.

FIG. 1 shows a plurality of subnets 103, 104, 120, 123, 127 that are communicatively coupled to one another through the use of the IP protocol. Here, IP network 101 may be viewed as a larger network that is able to direct a packet from a first subnet (e.g., subnet 103) to a second subnet (e.g., subnet 104) based upon the IP destination address found within the header of the packet. Note that the path through the IP network 101 from one subnet to the other (e.g., from subnet 103 to subnet 104) may involve multiple hops through various networking hardware elements (such as switches and/or routers).

A VoIP server 102 is used to control and facilitate VoIP based communications. Here, the VoIP server 102 acts as a control station that: 1) "keeps track of" the VoIP devices that can entertain a VoIP connection through a registration process; 2) helps setup a connection between at least a pair of VoIP devices that seek to establish a VoIP connection (e.g., by way of providing various services such as authentication, address resolution, etc.); and 3) becomes one of the hops through which an established VoIP connection flows (better said, once the VoIP connection is established, the packets that carry the real time data (such as a digital representation of an individual's voice and/or a video image) pass through the VoIP server 102).

FIG. 1 can be used to explain the role of the VoIP server 102 in more detail. As alluded to above, VoIP devices (such as VoIP devices 108 and 109) should be registered with the VoIP server 102 prior to their engaging in a VoIP communication. A VoIP device is any device that can act as an endpoint (e.g., a source endpoint or a destination endpoint) for a VoIP connection. Some VoIP devices may be stationary or quasi stationary (such as a personal computer (PC) equipped with a working telephone); while, other VoIP devices may be more easily moved such as a handheld phone, a handheld personal digital assistant (PDAs), a handheld device that behaves as a combination of the two, a laptop computer, etc.

Through the registration process, a new VoIP device effectively identifies itself to the VoIP server 102 as a "new member" of the VoIP community that the VoIP server 102 acts to support. Here, FIG. 1 shows registration information 112, 113 being directed from each of the VoIP devices' 108, 109 respective subnets 103, 104 to the VoIP server 102. As a result of the VoIP server's reception of this registration information 112, 113, the VoIP server is able to develop an understanding of the location and capabilities of the new VoIP devices 108, 109; and, integrate this information into its current understanding of the collection of various VoIP devices it may be asked to help orchestrate a VoIP connection for.

After the VoIP devices 108, 109 have been registered, they can thereafter engage in a number of different VoIP connections. As an example of how a VoIP connection can be established and carried out, an initiating VoIP device (e.g., VoIP device 108) sends signaling information 114 to the VoIP server 102 that effectively informs the VoIP server of the other VoIP device (e.g., VoIP device 109) to which the initiating VoIP device 108 wishes to communicate with. In response, the VoIP server 102 resolves the address information for the called device and sends the signaling information 115 to the VoIP device 109 that acts as the recipient of the VoIP call; and, helps to establish the IP connection between the two VoIP devices 109. Once the connection is established, substantive data communications 114, 115 (e.g., in the form of one or more packets that carry real time information) between the VoIP devices 108, 109 flow through the IP server 102 in order to implement the call.

Note that in the exemplary depiction of FIG. 1, each of these VoIP devices 108, 109 are associated with a respective subnet 103, 104. Here, each subnet 103, 104 includes an IP gateway 107, 118 that is able to send and receive IP packets over a networking line 105, 106 (e.g., a copper or fiber optic cable). Each networking line 105, 106 couples its respective IP gateway 107, 118 to the IP network 101. Note that the hashed lines that couple each networking line 105, 106 to the VoIP server 102 within the IP network are drawn as such to indicate that multiple networking lines (e.g., via multiple hops through a plurality of routers and switches) may actually be used to reach the IP server 102 from a particular networking line 105, 106.

FIGURES

The present invention is illustrated by way of example and not limitation in the figures of the accompanying drawings, in which like references indicate similar elements, and in which:

FIG. 1 relates to a manner in which a VoIP connection can be entertained.

FIG. 2 relates to a manner in which a mobile VoIP connection can be entertained.

FIG. 3 relates to an improved manner in which a mobile VoIP connection can be entertained.

FIG. 4a relates to a manner in which a network can be reconfigured in order to support the improved mobile VoIP connection of FIG. 3.

FIG. 4b relate to a manner in which call setup and the subsequent substantive call can be performed in order to support the improved mobile VoIP connection of FIG. 3.

DESCRIPTION

Figure 2:
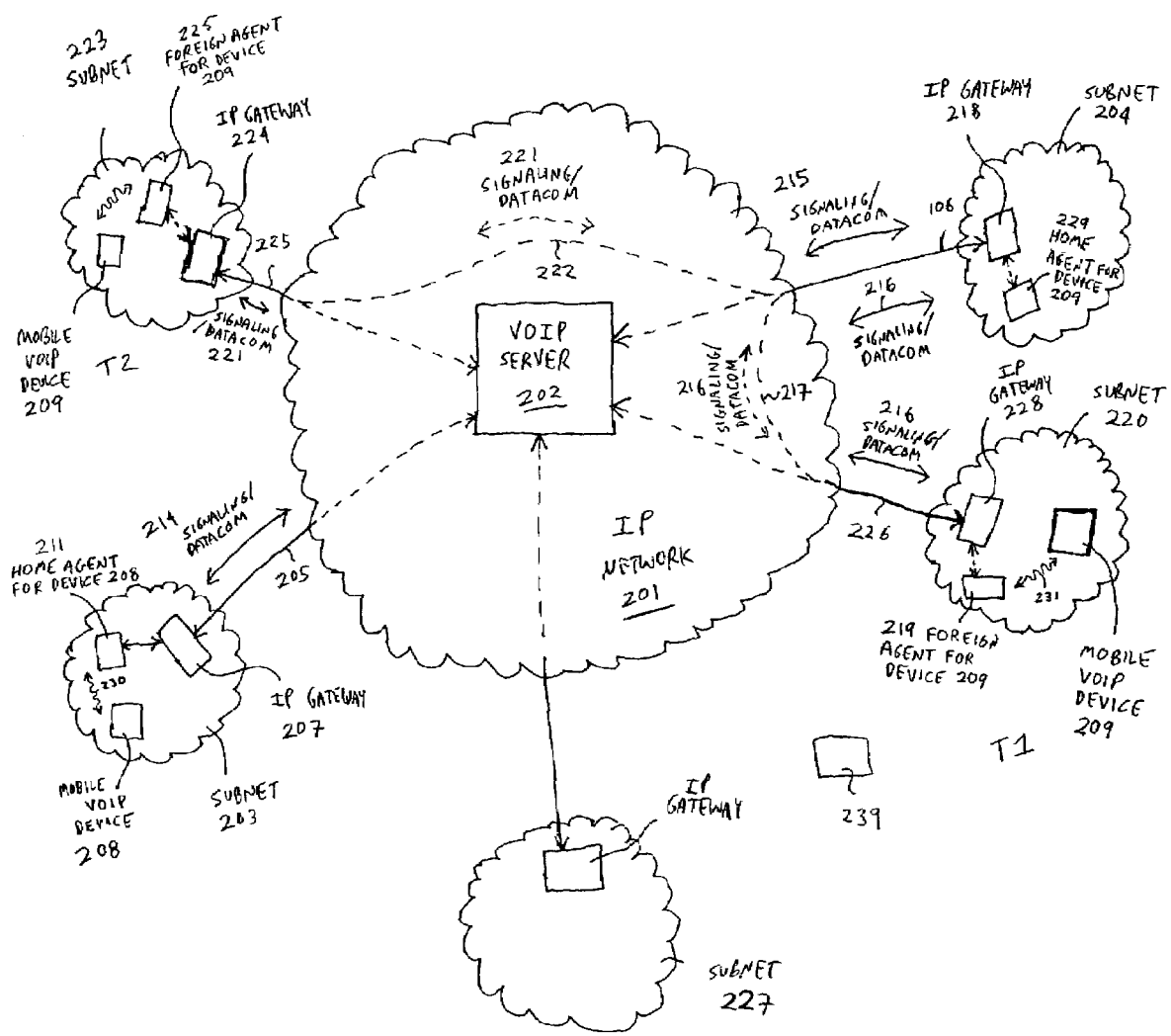

FIG. 2 relates to the present manner in which Voice Over IP (VoIP) communications are supported for mobile VoIP devices. As alluded to in the Background section, Mobile VoIP devices are typically handheld or laptop devices that can act as an endpoint (e.g., a source endpoint or a destination endpoint) for a VoIP connection. Examples of handheld devices include a handheld phone, a handheld personal digital assistant (PDAs), a handheld device that behaves as a combination of the two, etc. An example of a laptop device is a laptop computer, etc. Accordingly, with respect to the exemplary depiction of FIG. 2, note that a first mobile VoIP device 208 is observed as part of subnet 203.

Figure 1:
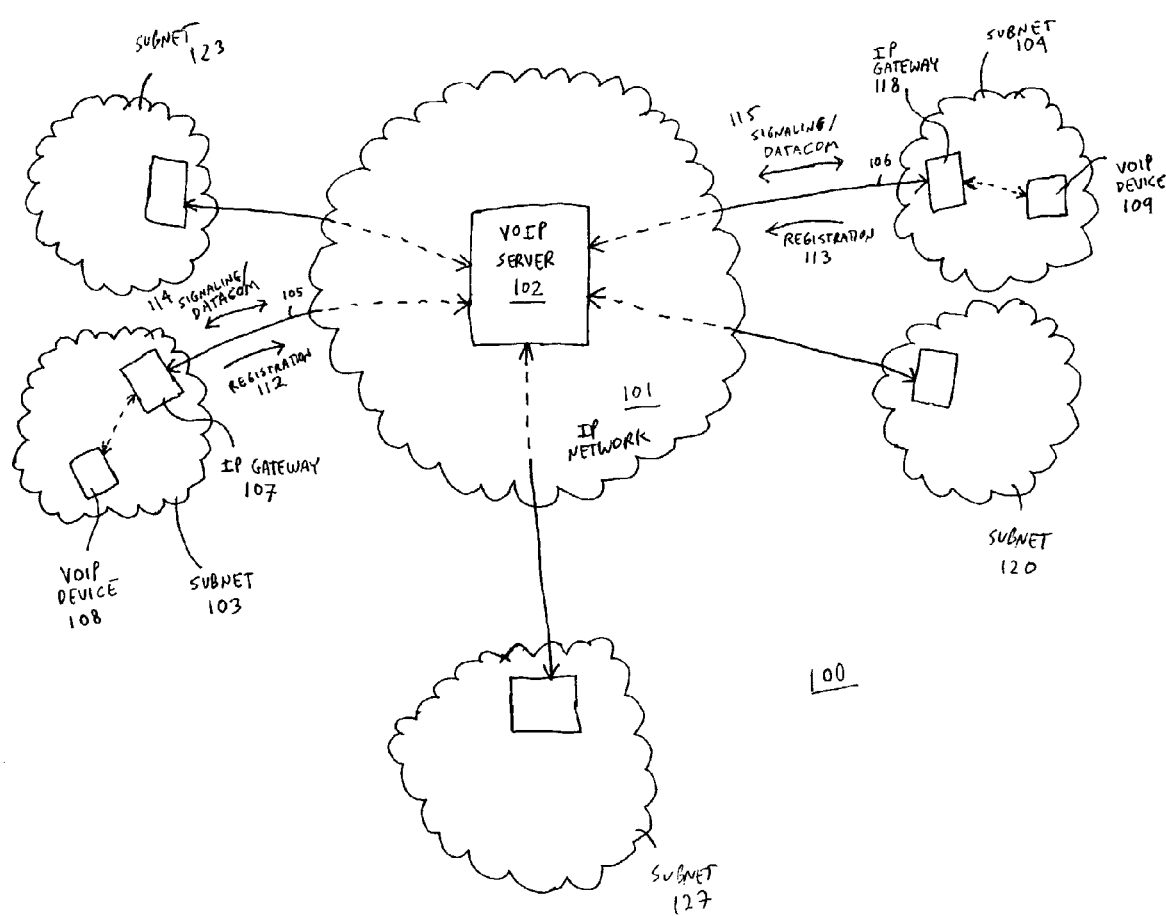

Because handheld mobile devices often participate within a network via wireless communication techniques, a wireless transmission 230 is drawn in FIG. 2 to illustrate (in a figurative manner) that mobile VoIP device 208 can send and receive information in a wireless fashion. The exemplary VoIP device 208 of FIG. 2 can be viewed as being recognized (e.g., by being registered with that VoIP server 202) as a component of subnet 203. Better said, subnet 203 is recognized by the VoIP server 202 as the "home" subnet 203 for mobile VoIP device 208. As such when mobile VoIP device 208 participates in a VoIP connection from within its "home" subnet 203, the VoIP connection can be implemented by the VoIP server 202 according to standard approaches such as those described with respect to FIG. 1.

However, complications arise when a mobile VoIP device migrates from outside its home subnet to within another subnet. For example, assume that mobile VoIP device 209, which is observed at time T1 as residing within subnet 220 of FIG. 2, is registered with the VoIP server 202 as having subnet 204 as its home subnet. Better said, according to the depiction of FIG. 2, mobile VoIP device 209 has migrated from its home subnet 204 to another "foreign" subnet 220 (e.g., because its owner has carried the device 209 from a first geographic region that is within the wireless transmission reaches of subnet 204 to a second geographic region that is within the wireless transmission 231 reaches of subnet 220).

According to the "Mobile IP" approach (an embodiment of which is described in the Internet Engineering Task Force (IETF) Request For Comment (RFC)3220, a home agent is needed within subnet 204 in order to correct for the disparity between the registered home subnet 204 of the mobile VoIP device 209 and the foreign subnet 220 that the mobile VoIP device 209 is currently located within the communicative reaches of. As such, a home agent 229 is observed with the home subnet 204 of the mobile VoIP device 209. Note that, in this instance, subnet 220 can be regarded as a "foreign" subnet with respect to mobile VoIP device 209; and, mobile VoIP device 209 can be regarded as a "foreign" mobile VoIP device 209 with respect to subnet 220.

According to a "non co-located" Mobile IP approach, another "foreign" agent 219 is available within a foreign subnet 220 when mobile VoIP device 209 roams outside of its home subnet 204 and falls within the communicative reaches of the foreign subnet 220. The mobile VoIP device 209 "registers" with the foreign agent 219 of the newly entered, foreign subnet 220. That is, some form of signaling is initiated that lets the foreign agent 219 of the foreign subnet 220 realize that a foreign mobile VoIP device 209 has just entered its subnet. Part of this signaling involves the identification, by the mobile VoIP device 209, of its home subnet 204.

In response to this information, the foreign agent 219 within the foreign subnet 220 signals the whereabouts of the mobile VoIP device 209 to its home agent 229 (that is, the foreign agent 219 informs home agent 204 that mobile VoIP device 209 has just entered subnet 220). In another approach, referred to as "co-located", no foreign agent 219 is needed; and, the roaming mobile device 209 simply directs a packet to its home agent 229 from within its foreign subnet 220. For simplicity, the "non co-located" approach will continue to be discussed. Note that use of the term "foreign" is relative to mobile device 209. As such, foreign agent 219 may also act as the home agent for other devices (not shown in FIG. 2) who are registered with the VoIP server 202 as having subnet 220 as their home subnet.

With the home agent 229 for mobile device 209 understanding as to where the mobile VoIP device 209 has roamed to, the home agent 229 of the roaming mobile VoIP device 209 can help direct and establish a call to the device 209 (should one be attempted). For example, if VoIP device 208 of subnet 203 attempts to establish a VoIP call with roaming VoIP device 209, the VoIP server 202 will send signaling information 215 to the IP gateway 218 of the receiving VoIP device's home subnet 204 (because the VoIP server 202 is not apprised of the roaming activity of device 209 in accordance with the Mobile IP standard). In response, the home agent 229 of device 209 establishes a tunnel connection 217 to the foreign agent 219 located where the receiving VoIP device 209 currently resides.

With the tunnel connection 217 being established, the home agent 229 of the mobile device 209 acts as a "link" in the connection between device 208 and device 209. That is, the call setup signaling information 215 from the VoIP server 202 is forwarded 216 by home agent 229 to foreign agent 219 over connection 217. Foreign agent 219 helps ensure that the appropriate call setup signaling information is routed to the foreign VoIP device 209 to help setup the connection. Any responsive signaling information 216 returned from subnet 220 is routed along connection 217 to home agent 229; and then, from home agent 229 to subnet 203 via the VoIP server 202. Once the call is established, all the substantive data communication information 214, 215, 216 of the call that is passed between devices 208, 209 similarly travels though the VoIP server 202, subnet 204, connection 217 and subnet 220.

The use of the home agent 229 for handling the communication with its roaming device 209 results in inefficient usage of networking resources. This can be observed with a few examples. Firstly, note that if the roaming mobile device 209 roams to the other end of the IP network 201 to a subnet 223 that is proximately located to the subnet 203 of the device 208 that is initiating the call, the connection path for the call stretches a first wide expanse across the IP network 201 (through the VoIP server 202) from the initiating subnet 203 to the home subnet 204; and then stretches back a second wide expanse (as represented by tunnel connection 222 between home agent 229 and foreign agent 225) from the home subnet 204 to the foreign subnet 223. Given that VoIP connections are sensitive to network propagation delays, the passing of packets across a pair of wide expanses through the IP network 201 may threaten the viability of the VoIP connection in an instance where the roaming device is proximate to the initiating device, but far removed from its own subnet.

Furthermore, as roaming capability depends upon the use of the roaming device's home agent to sustain a call, those subnets that do not have a home agent cannot support VoIP connections for their respective devices. Thus, noting that subnet 227 is not configured with a home agent, if roaming mobile VoIP device 239 is registered with the VoIP server 202 as having subnet 227 as its home subnet, no VoIP call can be made to the device 227 while it is roaming. As such, 100% roaming support for all mobile devices require a home agent within its own home subnet; which, in turn, raises per subnet implementation costs. Thus, in summary, integrating critical functionality to each subnet that is registered as the home subnet for a roaming mobile device can not only threaten Mobile VoIP connection viability in certain circumstances but can also raise per subnet implementation costs.

Figure 3:
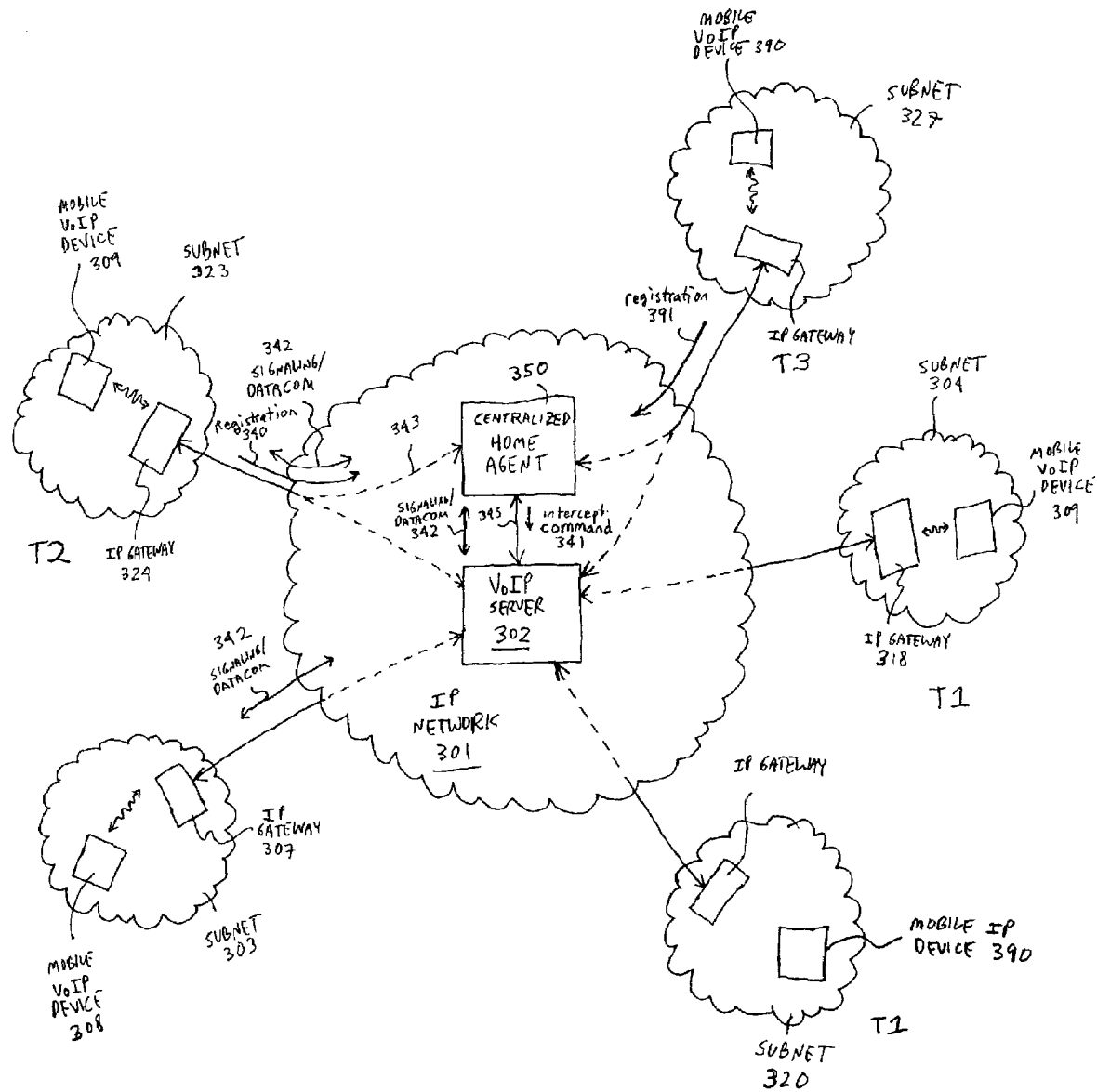

A solution is to collapse the fully distributed approach undertaken by the "Mobile IP" standard into a more centralized form. FIG. 3 shows a depiction. According to the approach of FIG. 3, a centralized home agent 350 is communicatively coupled to the VoIP server 302. Here, the centralized home agent acts as the home agent for a plurality of subnets 303, 304, 320, 323, 327. Thus, as described in more detail below, the centralized home agent 350 eliminates the need for a home agent in each subnet registered as the home subnet for a VoIP device that is to receive roaming service. Furthermore, the concept of a home subnet can still be entertained.

It is important to point that the term "VoIP", as that term is used with respect to the teachings that follow, is meant to include any packet network technology that allows "real-time" data communications (e.g., voice conversations such as those associated with a telephone conversation or a video conference; video images such as those associated with a video conference or other "live" video feed, etc.) over an IP network. Thus, the term VoIP is meant to embrace any of a number existing protocol schemes such as the International Telecommunication Union (ITU) H.323 (hereinafter the "H.323 standard"), the ITEF Session Initiation Protocol (hereinafter, the "SIP standard"), the Media Gateway Control Protocol (MGCP), as well as other approaches that may be developed in the future. Thus, the present discussion uses VoIP only as an example; and, the teachings described herein may be applied to any protocol where packets are sent through a "middle box" (e.g., the VoIP server). A non-VoIP application (e.g, media streaming) implemented with HTTP communications flowing through a proxy server between a server and a browser could be supported for roaming in a similar way.

Because the centralized home agent 350 provides centralized home agent functionality, roaming mobile VoIP devices are registered with the centralized home agent 350 to keep track of their current network locations. For example, referring to FIG. 3, note that mobile VoIP device 309 is within subnet 304 (at time "T1"); and, mobile VoIP device 390 is within subnet 320 (at time "T1). Both devices 309, 390 may be assumed to be registered with both the VoIP server 302 and the centralized home agent 350. In this case subnet 304 can viewed as the "home" subnet for device 309 because of its being registered with VoIP server 302; and subnet 390 can be viewed as the home subnet for device 390 because of its being registered with the VoIP server 302. That is, at any particular instant, the home subnet for a device corresponds to the subnet that is registered with the VoIP server (rather than the centralized home agent 350). Nevertheless, the centralized home agent 350 will receive new roaming registration information 340, 391 from each of these devices 309, 390 upon their entrance to a "foreign" subnet (e.g., subnet 323 for device 309 at time "T2" as observed in FIG. 3; and, subnet 327 for device 390 at time T3 as observed in FIG. 3).

As such, a centralized home agent (such as centralized home agent 350) may be viewed as any device that: 1) can accept roaming registration information from mobile VoIP devices having different home subnets and that have roamed in different foreign subnets; and, 2) perform some substantive action in response to the roaming registration information (such as updating a registration database, sending an intercept command to a VoIP server (e.g., as described in more detail below), etc.) other than merely forwarding it to another node (e.g., as a mere nodal hop "on the way" to the centralized home agent might perform).

For simplicity, in the discussion that follows below, embodiments of possible registration, call setup and data communication processes (as they may be implemented with a centralized home agent 350) are discussed with relation to one roaming mobile VoIP device—device 309 in subnet 323. However, it is important to keep in mind that a more centralized approach (as opposed to completely distributed approach) entertains the ability of a single home agent (e.g., centralized home agent 350) to "handle" the registration information from a plurality of different mobile devices (e.g., device 309 at time "T2", and device 390 at time "T3") who: 1) have roamed into different foreign subnets (e.g., subnets 323 and 327, respectively); and, 2) are registered with the VoIP server as having different "home" subnets (e.g., subnets 304 and 320).

As a consequence of a roaming device being registering with the centralized home agent 350, the signaling used to setup a call to a roaming device (and the subsequent data communications that make up the substantive content of the call) flow through the VoIP server 302 and the centralized home agent 350 en route to the subnet where the roaming device resides. Here, the centralized home agent 350 tracks the mobile device 309 and assists in the routing of data packets destined to the roaming mobile device 309. In an embodiment, packets/datagrams are routed to the "care-of address" of the roaming mobile device (e.g., which includes the address of the foreign subnet where the roaming device resides) using a tunneling process known as encapsulation. The tunneling process includes incorporating an original data unit (data packet or datagram) within another data unit so that fields within the original IP header temporarily lose their effect.

When the mobile VoIP device 309 roams to a foreign subnet (such as subnet 323 as observed at time T2 of FIG. 3), the roaming VoIP device 309 will send (e.g., upon entry of the foreign subnet 323) registration information 340 to the centralized home agent 350. Here, note that the roaming VoIP device 309 may be said to have entered a "region" that is within the communicative reaches of subnet 323. For example, in the case of wireless connectivity, the mobile device 309 may fall within "earshot" of a wireless receiver that is part of subnet 323. With respect to wired devices, the region may include an office or other location where an access cable to (or in) subnet 323 resides. Thus, it is important to take note that mobile VoIP devices may be either wireless or wired devices. Here, mobile means anything that is movable.

In various embodiments, the registration information 340 can be sent along a separate connection (or other form of communicative data path) that is established between the mobile VoIP device and the centralized home agent 350 (e.g., such as connection 343 between mobile VoIP device 309 and and centralized agent 350). In response to the reception of the registration information 340, the centralized home agent 350 sends a registration reply to the mobile device 309 and an intercept command 341 to the VoIP server 302. Here, in various embodiments, the intercept command 341 can be constructed so that it identifies to the VoIP server 302 (e.g., by including the registration address or other identifying information that is unique to the mobile VoIP device 309) that the particular mobile VoIP device 309 that is no longer within its home subnet 304. As alluded to in the background, a VoIP server 302 is any device that: 1) maintains the registration information that correlates each mobile VoIP device to its particular home subnet; and, 2)

acts as a nodal hop for the flow of signaling and substantive VoIP content for a VoIP connection made to a VoIP device that it maintains the registration of.

Note that the VoIP server 302 does not need to be informed of the specific subnet 323 within which the roaming VoIP mobile device 309 resides; although, in various embodiments, the VoIP server 302 may be so informed. In various alternative embodiments the intercept command 341 may cause the VoIP server 302 to inquire back to the centralized home agent 350 (e.g., via a responding message to the intercept command 341) for the identity of the roaming device 309 (rather than informing the VoIP server 302 directly).

Regardless, once the VoIP server 302 understands that a particular mobile VoIP device is roaming (such as mobile VoIP device 309 of FIG. 3), the VoIP server 302 will understand that sending signaling and a data communication information to the home subnet 304 would be pointless if a VoIP call is initiated to the roaming device 309 (e.g., by VoIP device 308). As such, if a call is made to the roaming VoIP device 309 (and, as a consequence of the earlier intercept command 341), the VoIP server 302 will direct the signaling information 342 needed to set up the call to the centralized home agent 350 rather than the home subnet 304 of the roaming device 309.

In response to the reception of the signaling information 342, the centralized home agent 350 (which can determine from the signaling information 342 that the intended recipient of the call is the roaming device 309) tunnels the received signaling information to the roaming device 309 at subnet 323. As such, if another device 308 initiates a call to the roaming device 309, the signaling information is intercepted by the VoIP server and forwarded to the centralized home agent 350. The centralized home agent, in turn, tunnels the signaling information to the mobile VoIP device.

Once a "real time" connection is established between mobile devices 309 and 390, substantive communications (e.g., a voice conversation) between the two devices 308, 309 will continue with the aid of VoIP server 302 and centralized home agent 350. That is, for example, data packets from the mobile device 390 destined to the mobile device 309 will be forwarded to the VoIP server 302 as usual. However, the VoIP server will forward the data packets to the centralized home agent 350 which knows the current location (care-of address) of the mobile device 309. Finally, the centralized home agent 350 tunnels the data packet to the mobile device 309 residing on subnet 323.

In summary, according to the approach of FIG. 3, voice data packets are "intercepted" by the VoIP server 302 and redirected to the centralized home agent 350 if necessary; which, in turn, directs them to the subnet 323 where the roaming device 309 has registered itself with the centralized home agent 350. Note that, according to the approach of FIG. 3, a home agent is not needed in every subnet (which lowers per subnet costs); and, furthermore, the call does not have to stretch twice-fold across the IP network 301 in order to implement the call. It is important to note that the roaming can happen even after the connection is established and while the media communication is on going. In this case, packets will be rerouted to and from the roamed device through the centralized home agent using the mechanism explained above.

Figure 4A:
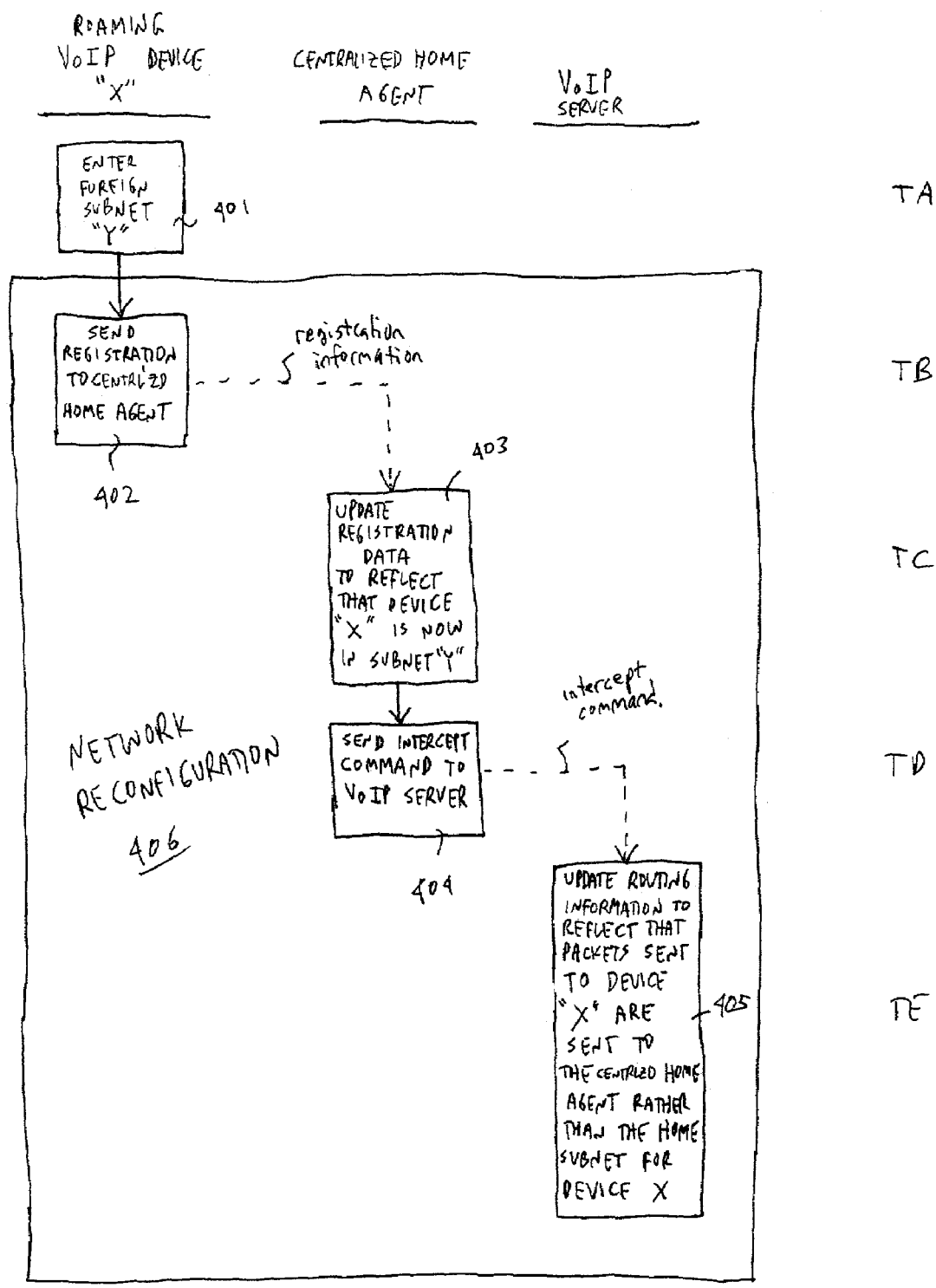

FIGS. 4a and 4b shows a trio of methodologies that are consistent with the discussion of FIG. 3 that was just provided above. FIG. 4a may be viewed as displaying a network configuration routine 406. Here, when a roaming device "X" (such as roaming device 309 of FIG. 3) enters 401 a foreign subnet "Y" (such as subnet 323 of FIG. 3), it sends a roaming registration request 402 to the centralized home agent. In response, the centralized home agent updates its registration binding information and sends a registration reply to the device X. It also sends an intercept command 404 to the VoIP server. This intercept command will provide the necessary re-routing notice regarding the roaming VoIP mobile device to the VoIP server.

In response to the intercept command, the VoIP server updates 405 its routing information to reflect that packets destined for device X should be sent to the centralized home agent rather than the subnet that is registered with the VoIP server as the home subnet for the roaming device (e.g., subnet 304 of FIG. 3). As a result of these operations 406, the network is effectively reconfigured without changing the home subnet registration of the roaming device within the VoIP server. Thus, should the roaming device re-enter its home subnet, it can re-register with the centralized home agent.

When the centralized home agent realizes that the roaming device X is no longer roaming (because it has entered its home subnet as registered with the VoIP server), it clears the previous interception command that had been issued to the VoIP server (e.g., by sending a message to the VoIP server that effectively retracts the original interception command). With the retraction of the intercept command, the VoIP server will forward packets destined to device X to its home subnet which corresponds to normal VoIP operation.

FIG. 4b displays a call setup routine 410 and a data communication routine 417. Here, the data communication routine 417 corresponds to the substantive call (e.g., the telephone conversation or video conference) between the roaming device "X" and another device "Z" (e.g., device 308 of FIG. 3) that initiated the call. The call setup routine 410 corresponds to the method by which the substantive call is established. The call setup routine 410 of FIG. 4b is illustrated so that it flows naturally from the network configuration routine 406 of FIG. 4a; and, the data communication routine 417 is illustrated so that it flows naturally from the call setup routine 410.

Referring to the call setup routine 410, once the network has been reconfigured to reflect that device X has roamed into subnet Y, VoIP device Z initiates a call to device X by sending 407 a signaling packet (for example a Q.931 Setup or SIP INVITE) to the VoIP server. In response, the VoIP server sends 408 signaling information to the centralized home agent; which, in turn, establishes a connection to the subnet where device X has roamed to ("Y").

Referring to the substantive call routine 417, device Z sends 411 a packet to the VoIP server; which in turn sends the packet (or, at least, its payload) to the centralized home agent. The centralized home agent 412 then sends the packet (or, again, at least its payload) to device X. Similarly, device X sends 414 a packet to the centralized home agent; which, in turn, sends 415 it (or at least its payload) to the VoIP server. The VoIP server then sends 416 at least the packet's payload to device Z. Note that if both devices X and Z happen to be roaming (i.e., both are outside their home subnet), the packets associated with call setup and data communication will first be sent by a first roaming device to the centralized call agent, then to the VoIP server, then back to the centralized home agent and then finally to the second roaming device.

Figure 5A:
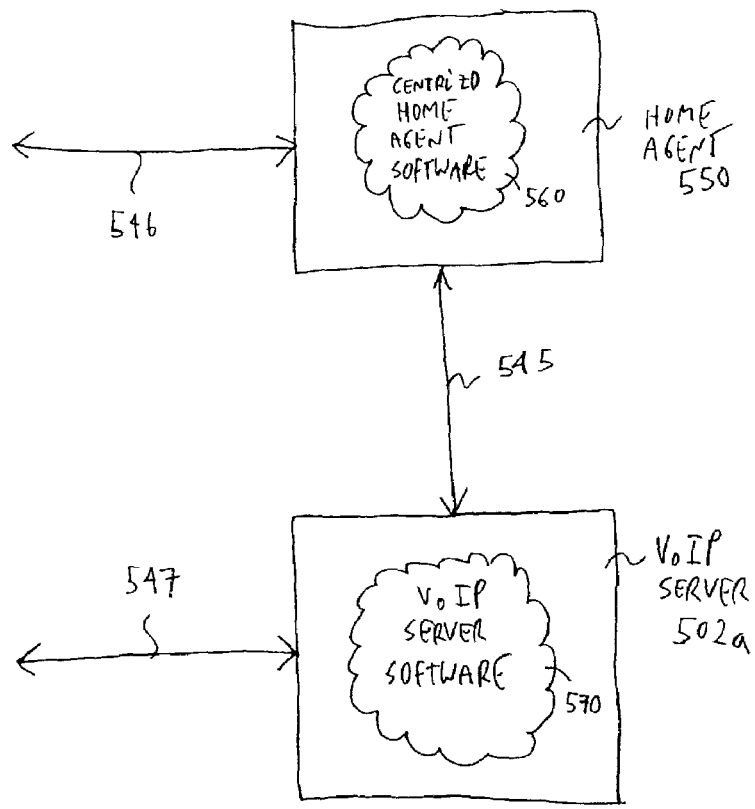
FIG. 5a shows a centralized home agent and VoIP server implemented with different machines.

The functionality of the centralized home agent and the VoIP server may be largely implemented in software. As such, the functions of the centralized home agent and the VoIP server may be readily configured to operate in one machine or in a pair of machines. FIG. 5a shows an embodiment where the two functions are separated into different machines (e.g., a VoIP server box 502b having VoIP software 570 and a Centralized Home Agent box 550 having centralized home agent software 560); and, FIG. 5b shows an embodiment where the two functions are integrated into a common machine (e.g., an integrated Centralized Home Agent/VoIP server 502b having centralized home agent software 561 and VoIP server software 571 integrated as part of the server's overall system software 580).

With respect to the two box solution of FIG. 5a, the networking link 545 may be viewed as a physical networking line (e.g., fiber optic or copper cabling) that connects the two machines 550, 502a together; or, alternatively, may be viewed as a communicative coupling that exists or can be established (e.g., via a connection) over a network. In one embodiment, the pair of machines 550, 502a reside within the same subnet so that the latency associated with the communications between the two is reduced. Note that networking lines 546, 547 are apt to be separate networking lines so that one line is coupled to one machine (line 546 and centralized home agent 550) while the other line is coupled to the other machine (line 547 and VoIP server 502a). The lines 546 and 547 are accessible to the roaming and non-roaming devices outside of the subnet.

Figure 5B:
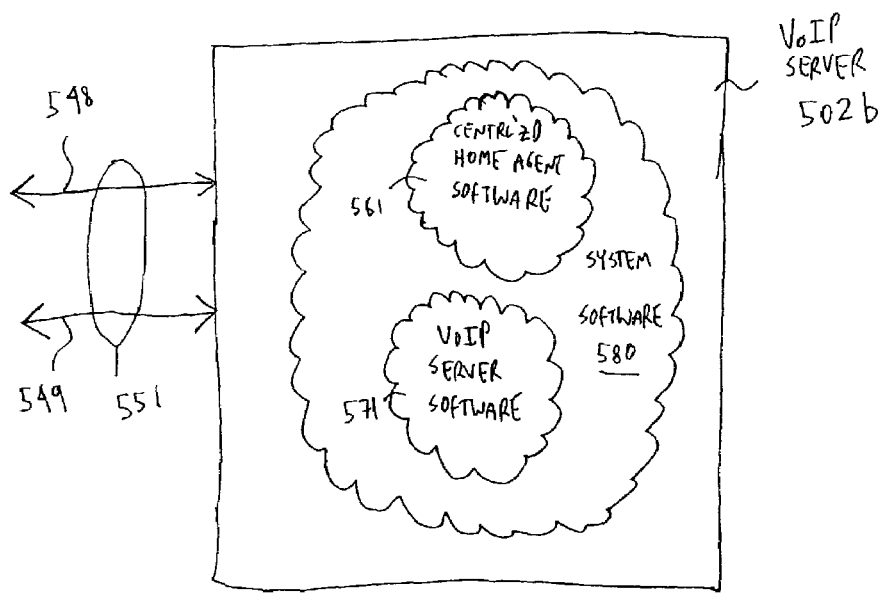
FIG. 5b shows an integrated centralized home agent/VoIP server machine.

With respect to the implementation of FIG. 5b, both the centralized home agent and VoIP server software have been integrated into a common machine 502b. Here, the common machine may be viewed as an integrated Centralized Home Agent/VoIP server 502b that changes its home registration information for each roaming device after its registers upon entry within a foreign subnet. The roaming information is directly communicated through internal mechanisms to the VoIP server instead of the intercept command sent over connections described in FIG. 4a.

In alternate embodiments, direction interactions may be established between the functionality of the centralized home agent software 561 and the functionality of the VoIP server software 571 so that, internally, the server 502b operates as described in FIGS. 4a and 4b. Regardless as to which approach is undertaken, note that either a pair of networking lines 548, 549 or a single networking line may be used to link the communication between a pair of mobile devices. In the later case, for example, line 548 may send packets to a pair of devices that are engaged together in a VoIP call as well as receive packets from a pair of devices that are engaged in a VoIP call.

Figure 6:
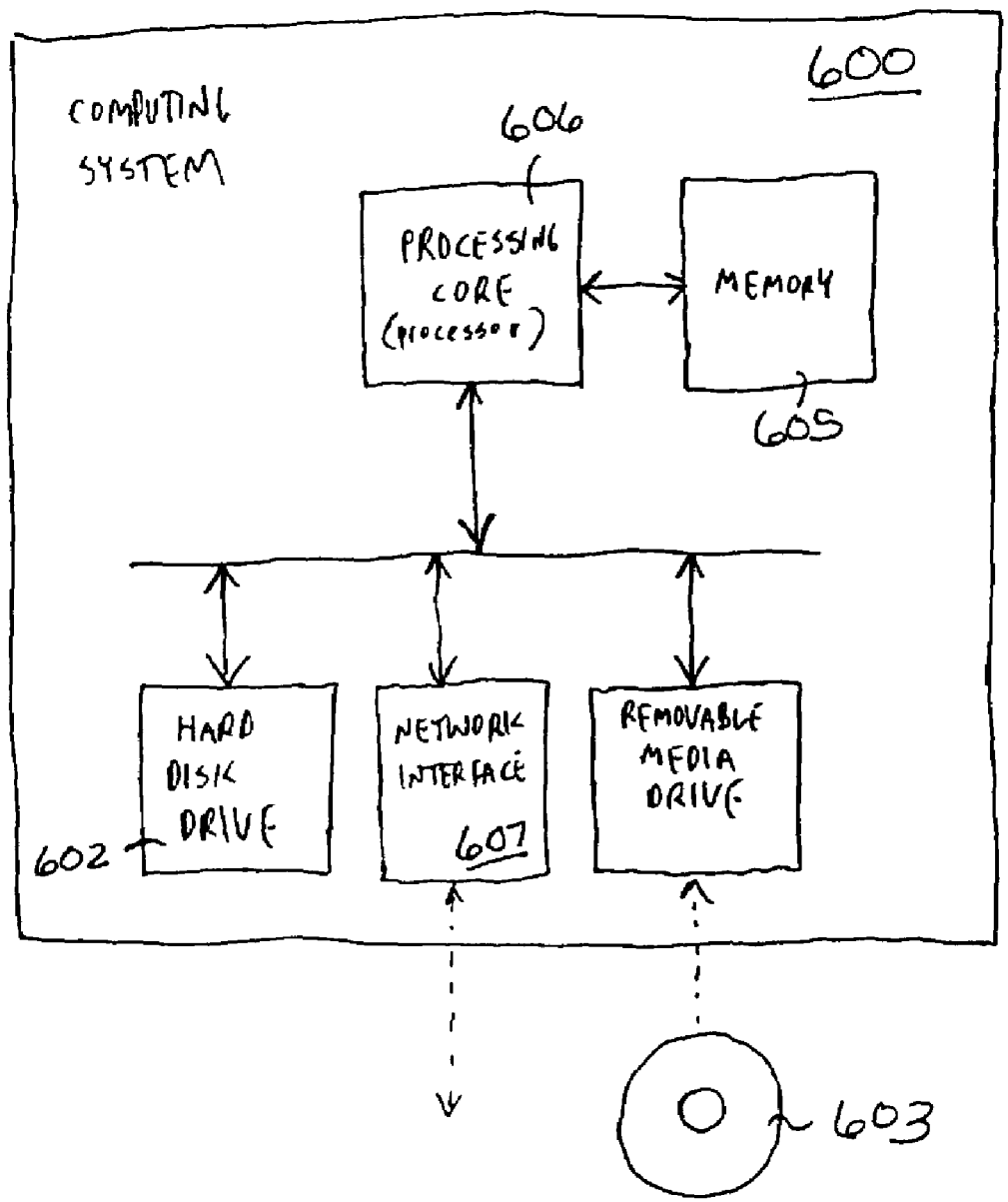
FIG. 6 shows an embodiment of a computing system.

FIG. 6 shows an embodiment of a computing system 600 (e.g., a server) that may be used to implement either the "two-box" solution of FIG. 5a or the "one-box" solution of FIG. 5a. In particular, the computing system 600 of FIG. 6 can execute instructions residing on a machine readable medium in order to perform the centralized home agent software and/or VoIP server software referred to above (noting that other (e.g., more elaborate) computing system embodiments are possible). In one embodiment, the machine readable medium may be a fixed medium such as a hard disk drive 602. In other embodiments, the machine readable medium may be movable such as a CD ROM 603, a compact disc, a magnetic tape, etc. The instructions (or portions thereof) that are stored on the machine readable medium, are loaded into memory (e.g, a Random Access Memory (RAM)) 605; and, the processing core 606 then executes the instructions. The instructions may also be received through a network interface 607 prior to their being loaded into memory 605.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc. The processing may also be done in Network Processing Units dedicated for network processing in devices like routers and firewalls.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
  a) a first registering with a centralized home agent having a location central to a plurality of subnets, said first registering in response to a first mobile VoIP device having entered a first region that is within a communicative reach of a first subnet, said first registering identifying said first mobile VoIP device and said first subnet to said centralized home agent, said first subnet not registered as a home subnet for said first mobile VoIP device; and
  b) a second registering with said centralized home agent, said second registering in response to a second mobile VoIP device having entered a second region that is within a communicative reach of a second subnet, said second registering identifying said second mobile VoIP device and said second subnet to said centralized home agent, said second subnet not registered as a home subnet for said second mobile VoIP device, said home subnet for said first mobile VoIP device being a different subnet than said home subnet for said second mobile VoIP device.

2. The method of claim 1 wherein said first mobile VoIP device is a handheld device.

3. The method of claim 2 wherein said first mobile VoIP device further comprises a handheld phone.

4. The method of claim 2 wherein said first mobile VoIP device is a personal digital assistant.

5. The method of claim 1 wherein said first mobile VoIP device is a laptop computer.

6. The method of claim 1 further comprising sending an interception command from said centralized home agent to a VoIP server is response to said first registering, said interception command causing said VoIP server to route a packet destined for said first mobile VoIP device to said centralized home agent rather than said home subnet of said first mobile VoIP device.

7. The method of claim 6 wherein said packet is a signaling packet that helps setup a call to said first mobile VoIP device.

8. The method of claim 7 wherein said centralized home agent establishes a connection from said centralized home agent to said first subnet in response to said centralized agent receiving said signaling packet.

9. A method performed by a centralized home agent, comprising:

a) receiving a first registration at a centralized home agent having a location central to a plurality of subnets in response to a first mobile VoIP device having entered a first region that is within a communicative reach of a first subnet, said first registration identifying said first mobile VoIP device and said first subnet, said first mobile VoIP device having another subnet besides said first subnet as its home subnet; and b) receiving a second registration at the centralized home agent in response to a second mobile VoIP device having entered a second region that is within a communicative reach of a second subnet, said second registration identifying said second mobile VoIP device and said second subnet, said second mobile VoIP device having another subnet besides said second subnet as its home subnet, said home subnet for said first mobile VoIP device being a different subnet than said home subnet for said second mobile VoIP device.

10. The method of claim 9 further comprising sending an interception command to a VoIP server is response to said receiving of said first registration.

11. The method of claim 10 further comprising receiving from said VoIP server a packet destined for said first mobile VoIP device.

12. The method of claim 11 wherein said packet is a signaling packet that helps setup a call to said first mobile VoIP device.

13. The method of claim 12 further comprising establishing a connection to said first subnet in response to said receiving of said signaling packet.

14. The method of claim 9 further comprising establishing a connection to said first subnet in response to said receiving of said frst registration.

15. A tangible machine readable medium having stored thereon a sequence of instructions which, when executed by a computing system that helps implement a centralized home agent causes said computing system to perform a method, said method comprising:

a) receiving a first registration at a centralized home agent having a location central to a plurality of subnets in response to a first mobile VoIP device having entered a first region that is within a communicative reach of a first subnet, said first registration identifying said first mobile VoIP device and said first subnet, said first subnet not registered as a home subnet for said first mobile VoIP device; and b) receiving a second registration at the centralized home agent in response to a second mobile VoIP device having entered a first region that is within a communicative reach of a second subnet, said second registration identifying said second mobile VoIP device and said second subnet, said first subnet not registered as a home subnet for said first mobile VoIP device, said home subnet for said first mobile VoIP device being a different subnet than said home subnet for said second mobile VoIP device.

16. The computer readable medium of claim 15 wherein said method further comprises sending an interception command to a VoIP server is response to said receiving of said first registration.

17. The computer readable medium of claim 16 wherein said method further comprises receiving from said VoIP server a packet destined for said first mobile VoIP device.

18. The computer readable medium of claim 17 wherein said packet is a signaling packet that helps setup a call to said first mobile VoIP device.

19. The computer readable medium of claim 18 wherein said method further comprises establishing a tunneling connection to said first subnet in response to said receiving of said signaling packet.

20. The computer readable medium of claim 15 further comprising establishing a tunneling connection to said first subnet in response to said receiving of said first registration.

* * * * *

UNITED STATES PATENT AND TRADEMARK OFFICE
CERTIFICATE OF CORRECTION

PATENT NO. : 7,292,558 B2　　　　　　　　　　　　　　　　　　　　　　Page 1 of 1
APPLICATION NO. : 10/229590
DATED : November 6, 2007
INVENTOR(S) : Adrangi et al.

It is certified that error appears in the above-identified patent and that said Letters Patent is hereby corrected as shown below:

In column 11, at line 33, delete "frst" and insert --first--.
In column 11, at line 34, delete "A tangible machine readable medium having stored".
In column 11, at line 35, delete "thereon" and insert --A computer readable medium encoded with--.

Signed and Sealed this

Twenty Second Day of April, 2008

JON W. DUDAS
*Director of the United States Patent and Trademark Office*